INVENTOR
Francisco F. Lázaga

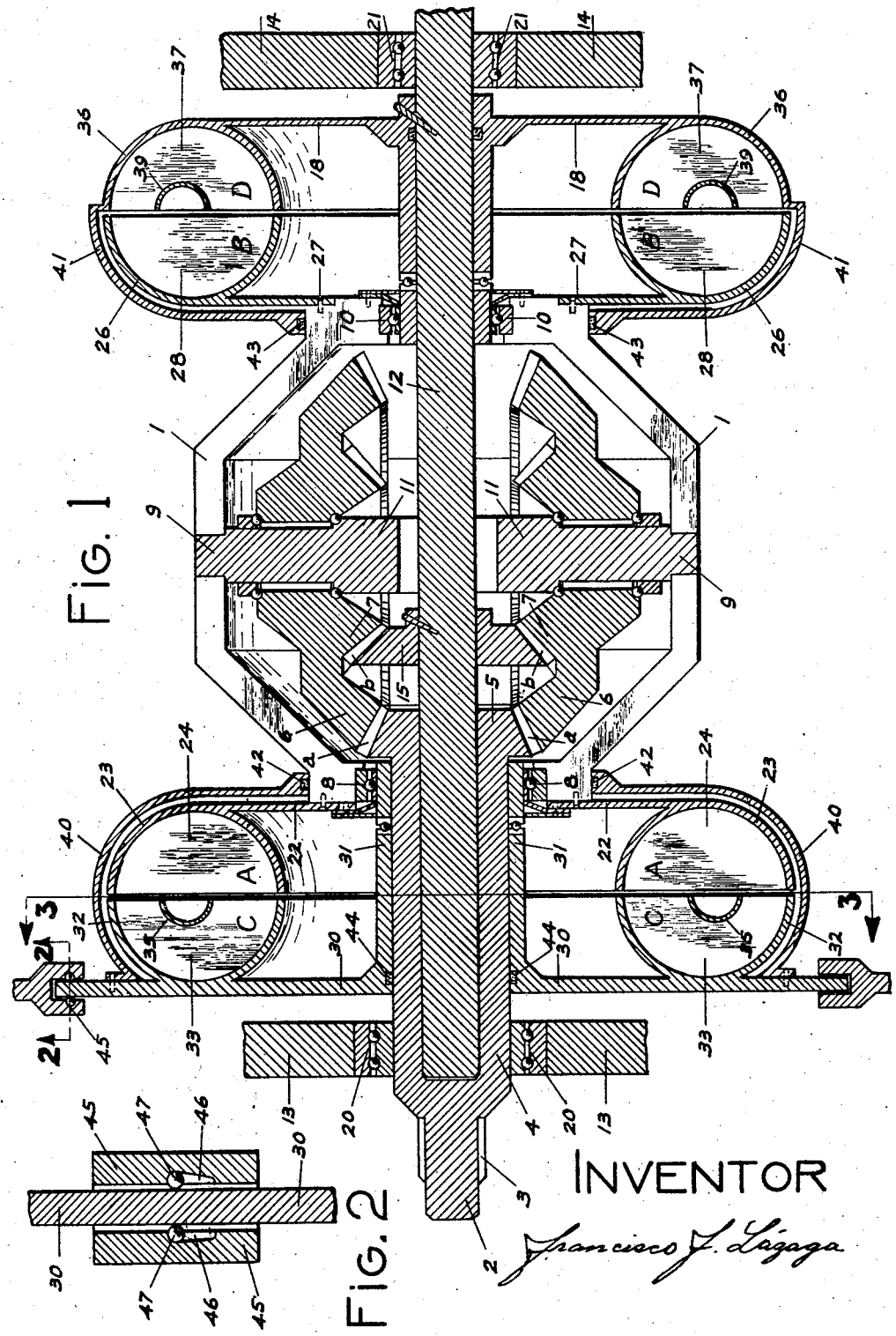

Patented Aug. 15, 1944

2,355,876

UNITED STATES PATENT OFFICE 2,355,876

FLUID BRAKE OPERATING TRANSMISSION

Francisco F. Lázaga, La Vibora, Habana, Cuba

Application January 25, 1943, Serial No. 473,439

1 Claim. (Cl. 74—189.5)

My invention relates to means for producing an intermediate gear ratio drive and a direct-drive by the combination of a differential transmission, a torus fluid brake, and a torus fluid coupling.

My invention may be described as improvement to be used in connection with my pending application, in the United States Patent Office, for "Progressive speed ratio transmission" (Serial Number 430,372, of February 11, 1942, Patent No. 2,309,912).

The objects of my invention are: first, to provide a device which will maintain all the gears engaged; second, a device which will regulate the power and motion transmitted from a driving shaft to a transmission shaft; third, to provide means so that the transmitted motion be in the same direction as the initial motion; fourth, to provide means so that the motion transmitted indirect, be without the running of gears; fifth, to provide means to produce an intermediate gear ratio torque by a torus fluid brake system; sixth, to provide a direct-drive by means of a torus fluid coupling; seventh, to provide means to have the entire device supported by a central shaft.

Other objects and advantages will be understood from the following description. I have attained these objects by means of the mechanism illustrated in the accompanying drawings, in which:

Fig. 1 shows a horizontal section through the transmission device.

Fig. 2 shows a detailed section through line 2—2, Fig. 1.

Similar numerals and letters refer to the same or similar parts throughout the different figures.

Figure 3:
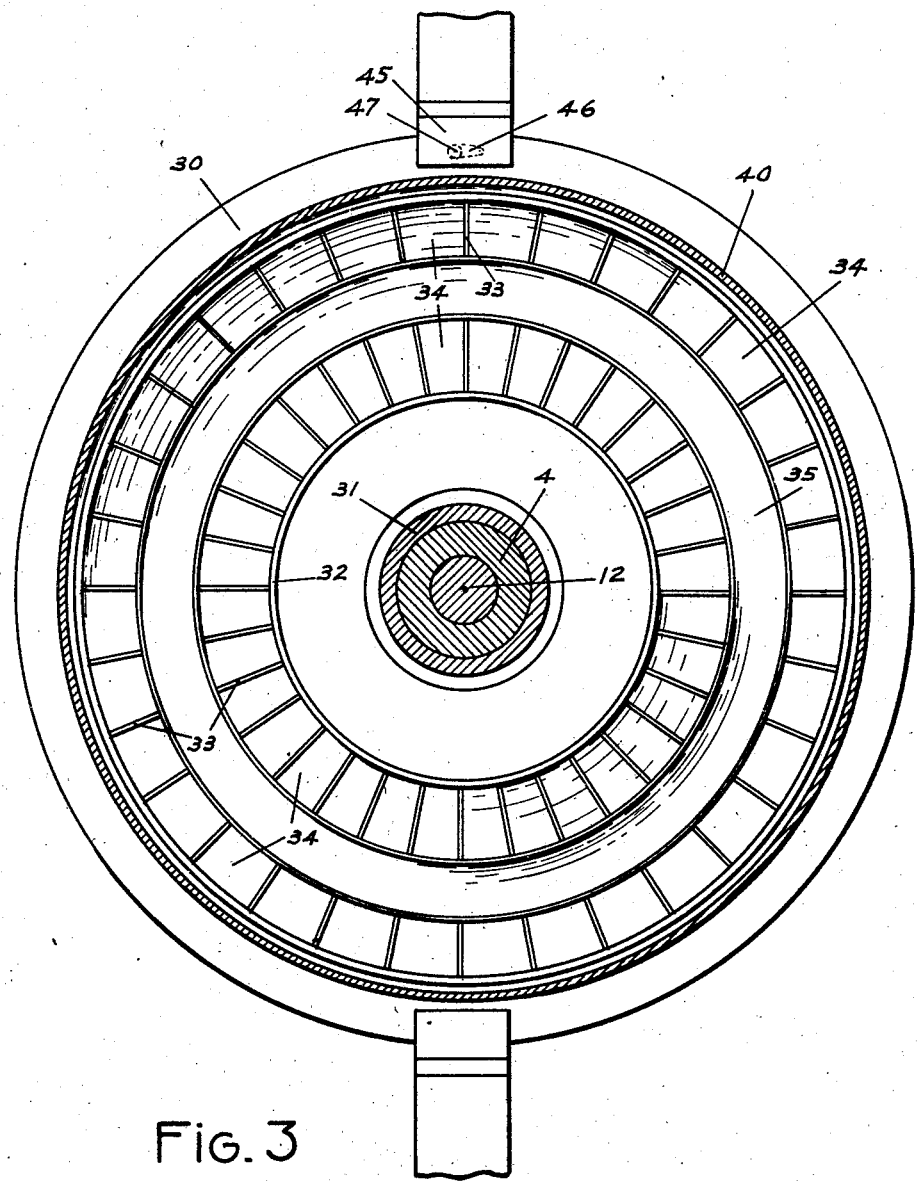
Fig. 3 shows a cross-section between two torus fluid members through line 3—3, Fig. 1.

Referring to the drawings, numeral 1 is used to designate a rigid case of circular cross-section, Fig. 1, which is adapted to rotate about an axis carrying bevel gears rotatable on axes arranged radially to said axis, Fig. 1, as hereinafter set forth.

Numeral 2 is a driving shaft provided with splines 3 to be coupled to the motor shaft, not shown in the drawings.

A tubular extension 4 of the drive shaft 2 carries a bevel pinion 5 which is in mesh at points $a$ with bevel gears 6. Other bevel gears 7 of lesser diameter are attached on the inner side of said bevel gears 6 for rotation therewith.

Number 9 designates a radial axle embedded at one of its ends in the case 1 and attached at its other ends to a ring 11, Fig. 1, by which transmission shaft 12 passes through into the tubular extension 4 of shaft 2, wherein it is supported.

A pinion 15, attached to the shaft 12, is in mesh with gears 7 at points $b$.

The gearing points $a$ and $b$ are on the same side, with regard to axles 9.

At one end case 1 is supported upon the tubular extension 4 of the drive shaft 2, through sealed-bearing 8, to avoid leakage of any oil therein contained. At its other end said case 1 rests upon transmission shaft 12 through sealed-bearing 10, Fig. 1.

A torus fluid shell 23 is attached to case 1 by means of support 22, and has vanes 24 welded radially in the mentioned shell 23, forming radial cells 34, Fig. 3. I shall call this assembly, constituted of parts 22, 23 and 24, Fig. 1, driving member A.

A flat disc wheel 30 is fastened on hub 31, which rotates independently upon the tubular extension 4 of shaft 2, and is provided with fluid retainer 44, and is located beside the driving member A.

A double action torus fluid shell 32 is supported by the disc wheel 30, and is located in front and facing the driving member A. This shell 32 has vanes 33 welded radially in it, forming radial cells 34, Fig. 3. A torus channelled ring 35 is embedded in the vanes 33, and is concentric with the aforementioned shell 32. I shall call this assembly, constituted of parts 32, 33 and 35, Fig. 1, double action member C.

A torus fluid shell 26 is attached to the other end of the case 1 by means of support 27, and has vanes 28 welded radially in the shell 26, forming radial cells 34, Fig. 3. I shall call this assembly, constituted of parts 26, 27 and 28, Fig. 1, driving member B.

A torus fluid shell 36 is attached to the transmission shaft 12 by means of support 18, and is located in the rear and facing the driving member B. This shell 36 has vanes 37 welded radially in it, forming radial cells 34, Fig. 3. A torus channelled ring 39 embedded in the vanes 37 is concentric with the aforementioned shell 36. I shall call this assembly, constituted of parts 36, 37 and 39, Fig. 1, driven member D.

A "one-way" brake system constituted by a bracket to be attached to the frame or chassis, not shown in the drawings, has formed on the other end two flat jaws 45, each having a perpendicular channelled groove 46 in the inner portion, which is deeper in the upper portion. The outer part of the disc wheel 30 rotates between the two jaws 45. A steel ball 47 is deposited in each of the grooves 46, contacting said grooves on one side and the faces of the disc wheel 30 on the other side. This will act as a brake when the disc wheel tends to turn in the direction from the upper portion of the grooves, toward the bottom portion, driving the steel balls to the narrower or bottom portion of the grooves 46, thus compressing the steel balls 47 between the faces of the disc wheel 30 and the inner portion of the bracket jaws 45, hence providing the braking action. The brake is released when the rotation of the disc wheel 30 is reversed, thus tending to drive the steel balls 47 to the upper portion of the grooves 46, which being deeper, hence releases the compression of the steel balls 47 between the disc wheel 30 and the bracket jaws 45.

A torus fluid member housing or cover 40 is fastened on the double action member C, and is provided with a fluid retainer 42, to avoid leakage of any fluid therein contained, and is provided with a filler plug, not shown in the drawings.

A second torus fluid member housing or cover 41 is fastened on the driven member D, and is provided with a fluid retainer 43, and is provided with a filler plug, not shown in the drawings.

The above mentioned torus fluid members consist of two elements that form a pair or complete unit, being two pairs, members A and C and members B and D, which revolve with no mechanical connection between the two elements of each pair. The covers 40 and 41 being partly filled with fluid.

The motion of the fluid driving members A and B around their axes causes the fluid to rotate around the same axes. Being acted upon by centrifugal force and owing to the shape of the cells 34, the fluid also rotates around an axis which is circular and at right angle to the axis of rotation of the driving members. As the fluid flows from the cells 34 of the driving members A and B to the cells 34 of the double action member C and the driven member D, they impinge on the walls of the cells of these members. It is this combination of rotation and spiral motion of the fluid between the two members that tends to cause the action on the double action member C and driven member D. When the driving speed is very low, the combined forces acting on the fluid causes the fluid to move outward, through the driving members cells and it then returns to the starting point. However, the baffle rings 35 and 39 placed between the two elements interferes with the flow of fluid reducing the actuating effort or torque to such a point that the transmission shaft 12 will not move. When the driving members A and B are turning at higher speed the forces acting are greater and the fluid enters the double action member C and driven member D cells under much greater force and speed. The baffle rings 35 and 39 are no longer effective as the force has moved the fluid out of the range of the baffle rings and the fluid becomes a revolving mass. As soon as the speed is high enough to cause this condition outside the range of the baffle ring it will actuate on the double action member C and driven member D.

The driving member A, attached to the case 1 is gradually stopped by the fluid braking action of the double action member C, which will act as a brake at that moment, due to its being attached to the disc wheel 30, which is also braked in that turning direction, and released in the opposite turning direction, by means of the described "one-way" braking system, constituted of parts 45 and 47, Figs. 1, 2 and 3.

The driving member B, attached to the other end of the case 1 is gradually coupled to the driven member D, attached to the transmission shaft 12, by the fluid action inside of them.

The gripping effort in each one of the two pairs of fluid members A and C and members B and D may be varied by filling the two pairs of members with fluids of different viscosity; or by constructing said pairs of members in different diameters; or by constructing these two pairs of members with different numbers of actioning vanes, which thus provide a compensation between the gripping efforts of the two pairs of torus fluid members.

The whole transmission assembly is supported upon shaft 12, said shaft rests on supports 13 and 14 through bearings 20 and 21.

*Functioning*

Supposing that the shaft 12 is still, and consequently its pinion 15, then when gears 6 receive the stress from pinion 5, they will act as levers upon their axles 9, having as fulcrum the gearing points b on the gears 7 with the pinion 15, which is still. This will cause radial axles 9 to revolve, causing the transmission case 1 and so the driving member A to turn in the opposite direction to the shaft 2. In this condition, if by means of the double action fluid member C, which will act as a brake at that moment, the fluid driving member A together with case 1 is held, that is, its speed is lowered without altering the speed of the shaft 2, we shall have that the difference of motion will be transmitted to the pinion 15, therefore to shaft 12. As case 1 is gradually braked the speed of the shaft 12 will increase until reaching an intermediate speed and power. At the same time, the driving member B, which is attached to the other end of the case 1, will drive with it, causing a coupling effect on the driven member D.

When the resistance of the shaft 12 is great, the fluid driving member B, that is, the one that tends to produce a direct-drive coupling, which is provided with lighter viscosity fluid if necessary, will slip somewhat due to the excessive stress, then the stress is taken by the fluid driving member A, which actuates the intermediate gear ratio. As soon as the direct-drive coupling has sufficient stress to overcome the resistance of the shaft 12, the case 1 together with the driving member A will turn in the direction of shaft 2 and hence it will drive the double action member C with it.

I claim:

In a differential transmission the combination of a drive shaft; a transmission shaft coaxial with the drive shaft; supporting means applied at two points within the length of the transmission shaft; a transmission case independently rotatable upon the shafts; bevel gears rotatable in the transmission case on axes arranged radially to the axis of the shafts; bevel gears of lesser diameter attached on the inner side of the first bevel gears for rotation therewith; a bevel pinion carried by the drive shaft in meshing relation with the large bevel gears for drive of the same; a bevel pinion carried by the transmission shaft in meshing relation with the small bevel gears, all meshings being at same side of their axes of rotation; a double action torus fluid member independently rotatable upon the drive shaft; means to brake this double action torus fluid member in one turning direction and release it in the opposite turning direction; a torus fluid driving member attached on the outside of the transmission case facing the double action torus fluid member for fluidly holding the transmission case against rotation for effecting an intermediate speed drive; a second torus fluid driving member attached on the other end of the transmission case; a torus fluid driven member attached on the transmission shaft facing the second mentioned torus fluid driving member for effecting a coupling action for the direct-drive of the drive shaft and the transmission shaft; a cover attached on the double action torus fluid member for maintaining the fluid inside the two first mentioned members; and a second cover attached on the driven member for maintaining the fluid inside the two last mentioned fluid members.

FRANCISCO F. LÁZAGA.